CHRISTOPHER C. HIATT, OF RIDGEVILLE, INDIANA.

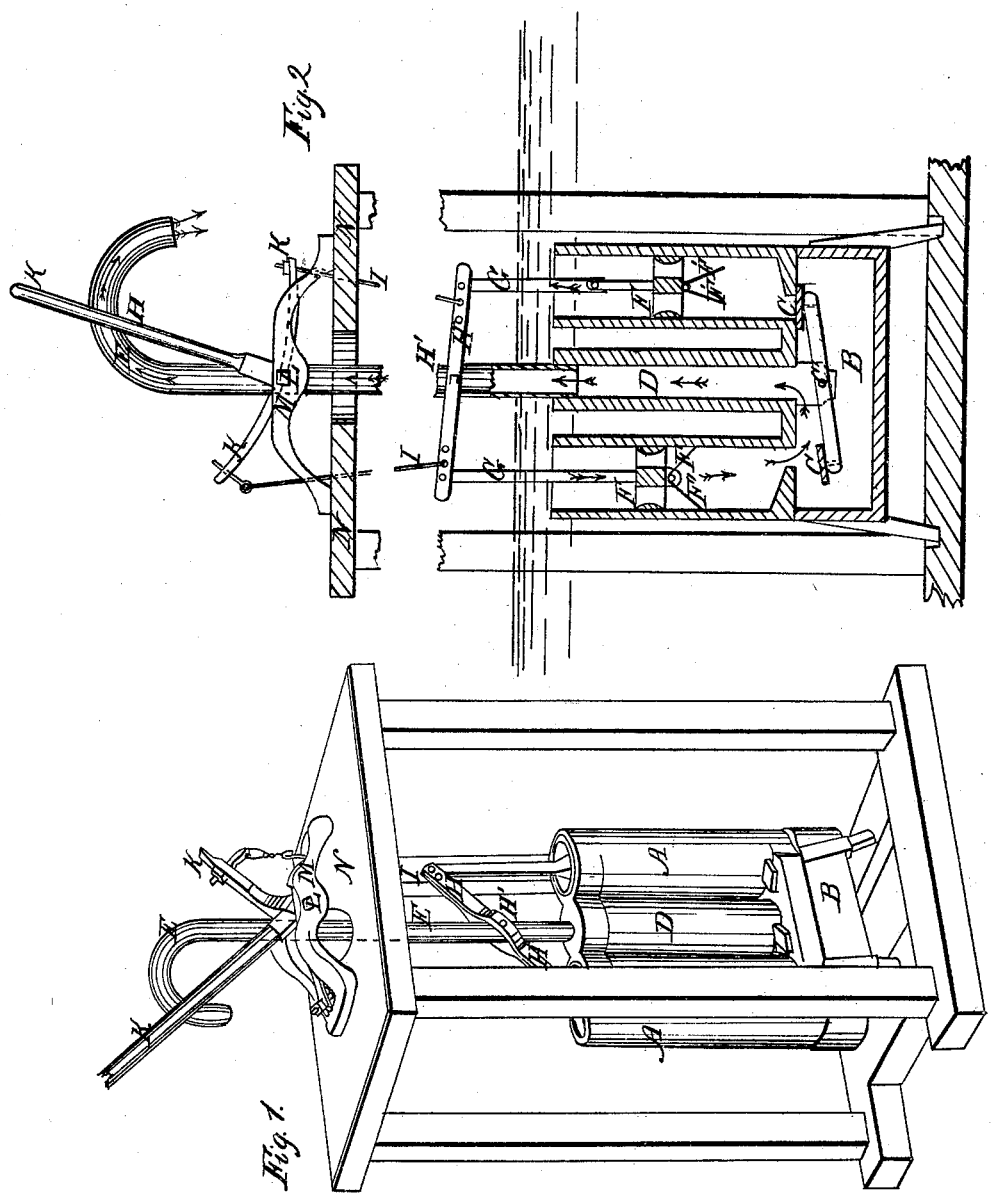

*Letters Patent No. 86,071, dated January 19, 1869.*

IMPROVED SUBMERGED FORCE-PUMP.

The Schedule referred to in these Letters Patent and making part of the same.

*To all whom it may concern:*

Be it known that I, CHRISTOPHER C. HIATT, of Ridgeville, in the county of Randolph, and State of Indiana, have invented a new and useful Improvement in Force-Pumps; and I do hereby declare that the following is a full, clear, and exact description of the same, reference being had to the annexed drawings, making part of this specification, in which—

Figure 1 is a perspective view, and

Figure 2 is a vertical section.

The same letters are used to indicate the same parts in both figures.

My improvements relate to pumps, which being placed in the bottom of a well, are used for forcing the water upward; and My invention consists in a novel combination and arrangement of parts to be hereinafter more fully described in the specifications and claims.

The pump has two parallel cylinders A A, which may be made of cast-iron, carefully bored to receive the plungers.

These cylinders are attached to a connecting-plate, which forms a cover for the tight chamber B, over which the cylinders rest, and into which the water flows from the cylinders alternately through valves C C, which are attached to an oscillating bar, C', in such manner that they will be alternately opened, as the plungers descend, to permit the outward flow of water from the cylinders into the chamber B, and closed with the ascent of the other plunger, to prevent the water flowing from the chamber into the cylinder.

The water passing into the chamber is forced upward through the tube D, which is also cast on the same plate with the two cylinders, and opens into the chamber, and is connected at the top with the pipe E, through which the water is elevated to the top of the well.

The plungers F F are made of brass, and are neatly fitted in the cylinders. They have openings passing vertically through them, so that the water may freely flow downward into the cylinder.

Two brass valves, F' F', are hinged to the bottom of the plunger, and so formed and arranged, that when the plunger rises, they will fall, and permit the water to flow into the cylinder, and as the plunger is pushed down, they will, by the pressure of the water, be spread outwardly, and being closely fitted to the cylinders, they will force the water down into the chamber B, and thence upward through the eduction-pipe.

The plungers are attached to the rods G G, which are fastened to each end of the oscillating bar H, which turns upon pins passing through each side of an eye formed in said bar, and into the tube E, which passes through said eye.

The wires I are attached to the oscillating bar H, at each end, and to the arms of the T-formed lever K.

This lever has its fulcrum on a bolt, L, passing through the arch M, which is bolted to the well-cover N.

The arch M is formed with a longitudinal slot to receive the T-formed lever K, and also with a hole through it, for the passage of the pipe E.

The bolt L serves also as a set-screw for holding the pipe E.

The plungers are alternately actuated by the oscillation of the handle of the lever K, and the water forced in a continuous stream through the pipe E.

What I claim as my invention, and desire to secure by Letters Patent, is—.

1. The construction of the valves F' F', substantially as shown and described.

2. The combination of the cylinders A, plungers F, and valves F', respectively, constructed and arranged substantially as set forth.

3. The bolt L, when used in combination with the lever H, arch M, and pipe E, for the purpose of forming both a fulcrum for the lever, and a set-screw fastening the pipe E in position, substantially as set forth.

In testimony whereof, I have signed my name to this specification, in the presence of two subscribing witnesses.

CHRISTOPHER C. HIATT.

Witnesses:
JAS. R. JONES,
JOHN MILLER.